United States Patent
Ishimoto et al.

(10) Patent No.: US 6,818,270 B2
(45) Date of Patent: Nov. 16, 2004

(54) HOLOGRAM LAMINATE AND HOLOGRAM LABEL

(75) Inventors: Miwa Ishimoto, Tokyo (JP); Masachika Watanabe, Tokyo (JP); Hiroyuki Ohtaki, Tokyo (JP); Kenji Ueda, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 10/156,137

(22) Filed: May 29, 2002

(65) Prior Publication Data

US 2002/0191233 A1 Dec. 19, 2002

(30) Foreign Application Priority Data

May 30, 2001 (JP) ........................................ 2001-162455

(51) Int. Cl.$^7$ ................................................. G02B 5/32
(52) U.S. Cl. ......................... 428/40.1; 283/81; 283/86; 283/94; 283/108; 359/1; 428/41.8; 428/41.9; 428/42.1; 428/195
(58) Field of Search ............................... 428/40.1, 41.8, 428/41.9, 42.1, 195; 283/81, 94, 86, 108; 359/1

(56) References Cited

U.S. PATENT DOCUMENTS 6,066,378 A * 5/2000 Morii ........................ 428/40.2
6,506,468 B1 * 1/2003 Morii ........................ 428/40.2

* cited by examiner

*Primary Examiner*—Nasser Ahmad
(74) *Attorney, Agent, or Firm*—Sughrue Mion, PLLC

(57) ABSTRACT

A hologram laminate allows traces of separation of the hologram to be clearly left on both the adherend and the hologram label and hence makes it possible to prevent reuse of the hologram and is excellent in graphical design function and suitable for certification purposes. A hologram label used for the fabrication of the hologram laminate is also provided. The hologram laminate has a metal thin-film layer, a release pattern, a transparent film, a hologram layer and a surface protective layer laminated on an adherend in the order mentioned. The hologram laminate is separable between the adherend and the transparent film. When the hologram is separated, the metal thin-film layer is left on the adherend in a pattern corresponding to the release pattern. The hologram label has a release sheet in place of the adherend in the hologram laminate.

5 Claims, 2 Drawing Sheets

HOLOGRAM LAMINATE AND HOLOGRAM LABEL

BACKGROUND OF THE INVENTION

The present invention relates to a hologram laminate and a hologram label that are suitable for certification and forgery preventing purposes.

Holograms allow information to be recorded on the surface of a hologram layer or in the direction of the thickness of a hologram layer and also permit three-dimensional image recording and reconstruction. Further, holographic images have an appearance that cannot readily be obtained by other image forming means because they are represented by the interference color of light. Although the method of producing holograms is per se known, it is difficult to forge holograms because the production thereof requires a precise operation using optical equipment. Accordingly, holograms are used as labels for certifying that labeled articles are authentic, and also used to prevent forgery of ID cards, bank cards, etc.

Various holograms are known, for example, a relief hologram in which information is recorded on the surface of a hologram layer, and a volume hologram in which information is recorded in the direction of the thickness of a hologram layer. When such a hologram is bonded to an adherend by using a pressure-sensitive adhesive, the hologram layer is readily separable due to the difference in material between the hologram layer and the adherend and hence replaceable with another. Therefore, it is necessary to make it impossible to replace the hologram layer with another when the hologram is used as a label for certification.

Under these circumstances, Japanese Patent Application Unexamined Publication (KOKAI) No. 2000-194265 discloses a hologram laminate comprising an adherend, a hologram layer and a surface protective film. In the hologram laminate, the surface protective film is provided with a release pattern, and the hologram layer is laminated over the release pattern fabricated surface of the surface protective film with a colored pressure-sensitive adhesive layer interposed therebetween. It is stated in the publication that when the hologram layer is separated, the colored layer is left on the adherend in a pattern corresponding to the release pattern, thereby preventing forgery. In the hologram laminate disclosed in the above-described publication, however, the bond strength of the colored pressure-sensitive adhesive layer is so high that the pattern showing the separation of the hologram is unclear. Accordingly, the conventional hologram laminate is inadequate for certification purposes. When the hologram laminate is used as a seal for certification, it is demanded that a pattern showing traces of separation of the hologram should be left even more clearly on both the adherend and the hologram label.

The present invention relates to a hologram laminate that allows traces of separation of the hologram to be clearly left on both the adherend and the hologram label and hence makes it possible to prevent reuse of the hologram. The present invention also relates to a hologram label used for the fabrication of the hologram laminate.

SUMMARY OF THE INVENTION

The present invention provides a hologram laminate having a metal thin-film layer, a release pattern, a transparent film, a hologram layer and a surface protective layer laminated on an adherend in the order mentioned. The hologram laminate is separable between the adherend and the transparent film. When the hologram is separated, the metal thin-film layer is left on the adherend in a pattern corresponding to the release pattern.

In addition, the present invention provides a hologram label having a metal thin-film layer, a release pattern, a transparent film, a hologram layer and a surface protective layer laminated on a release sheet in the order mentioned. The hologram label is separable between an adherend and the transparent film when it is stuck on the adherend at a surface thereof exposed by removal of the release sheet. When the hologram is separated, the metal thin-film layer is left on the adherend in a pattern corresponding to the release pattern.

The above-described metal thin-film layer may be a silver deposited layer.

The above-described surface protective layer may be a coating for surface protection.

The surface protective layer may be a film.

In the hologram laminate according to the present invention, when the hologram is separated, traces of the separation of the hologram are clearly left on the adherend. In addition, reuse of the separated hologram can be prevented. Accordingly, the hologram laminate is superior in forgery preventing properties and suitable for certification purposes. The hologram label according to the present invention allows a hologram laminate to be formed by sticking it on an adherend after removing the release sheet therefrom. Thus, it is possible to readily form a hologram laminate superior in forgery preventing properties and suitable for certification purposes.

DESCRIPTION OF THE PREFERRED EMBODIMENTS

The hologram laminate and hologram label according to the present invention are suitable for use as a hologram laminated on an object that has high economic value, i.e. high monetary value or high selling price, and is therefore likely to be illegally duplicated in a large quantity, to certify that the object is authentic for the purpose of preventing duplication.

Figure 1A:
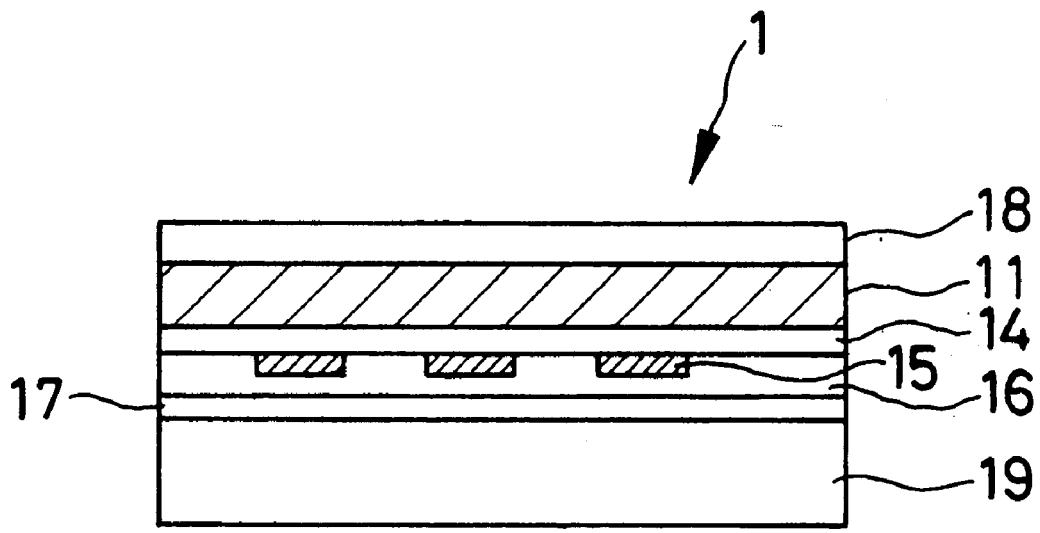
FIG. 1(a) is a sectional view of a hologram laminate according to the present invention.

FIG. 1(a) is a sectional view of a hologram laminate 1 according to the present invention. A metal thin-film layer 16, a release pattern 15, a transparent film 14, a volume hologram layer 11 and a surface protective layer 18 are laminated over a substrate 19 with a pressure-sensitive adhesive layer 17 interposed between each pair of adjacent lamination layers.

Figure 1B:
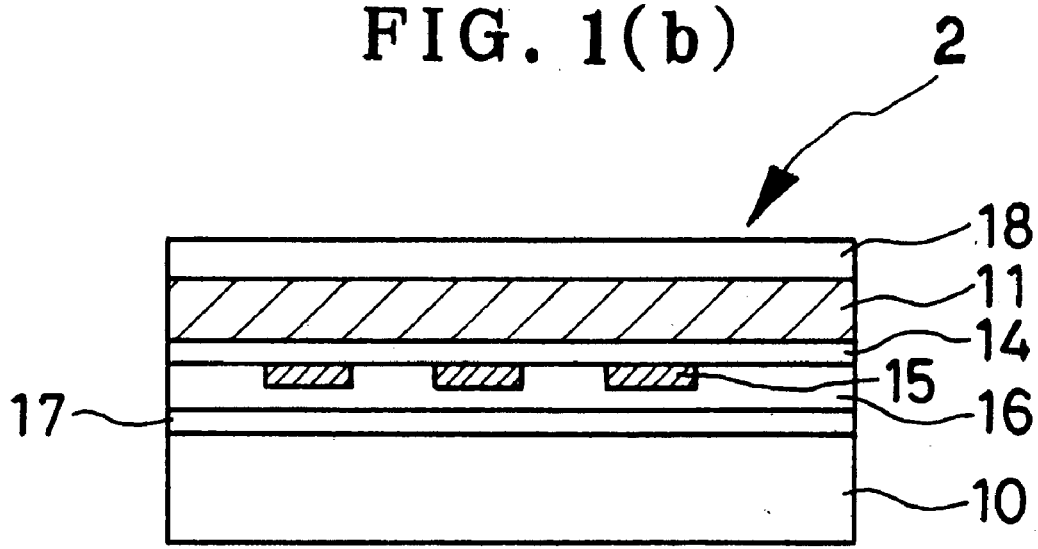
FIG. 1(b) is a sectional view of a hologram label according to the present invention.

FIG. 1(b) is a sectional view of a hologram label 2 used for the fabrication of the hologram laminate shown in FIG. 1(a). The hologram label has a release sheet 10 in place of the substrate 19. The rest of the hologram label has the same laminate structure as that shown in FIG. 1(a).

The substrate 19 shown in FIG. 1(a) is an adherend on which a hologram is stuck. The substrate 19 may be a rigid or non-rigid resin material, e.g. a vinyl chloride resin, a polyolefin resin such as polyethylene resin or polypropylene resin, an acrylic resin, a polycarbonate resin, a polyethylene terephthalate resin, or a triacetyl cellulose resin. The substrate 19 may also be a ligneous substrate, e.g. paper, synthetic paper, rubber, cloth, wood, or bamboo, or a metallic or ceramic material. Further, the substrate 19 may be an article obtained by processing these materials. The substrate 19 may be shaped in a variety of ways according to the configuration of each particular article, e.g. a sheet-like configuration, a flat plate-like configuration, a configuration with a quadratic surface, or a configuration with a cubic surface.

As a material for forming the volume hologram layer 11 in FIGS. 1(a) and 1(b), it is possible to use any of publicly known volume hologram recording materials, e.g. silver halide materials, dichromate gelatin emulsions, photopolymerizable resins, and photo-crosslinkable resins. It is particularly preferable to use photopolymerizable compositions consisting essentially of a matrix polymer, a photopolymerizable compound, a photopolymerization initiator, and a sensitizing dye, which are photosensitive materials for dry volume phase hologram recording. For example, "Omnidex" series (available from Du Pont) can be used. As a volume hologram recording material, it is also possible to use photopolymerizable compositions consisting essentially of a binder resin, a radial polymerization agent, a cationic polymerization agent, a sensitizing dye, a radical polymerizable monomer, and a cationic polymerizable monomer.

The volume hologram layer is preferably formed as follows. A recording material selected from among the above is applied to a dry thickness of 0.1 μm to 50 μm, preferably 1 μm to 20 μm, to form a recording material layer. Then, interference fringes produced by interference between object light and reference light are recorded directly on the recording material layer by using two laser beams, e.g. an argon laser beam (wavelength: 514.5 nm) and a krypton laser beam (wavelength: 647 nm). The volume hologram layer may also be formed as follows. A volume hologram original plate is brought into direct contact with a volume hologram forming material layer, and an argon laser beam (wavelength: 514.5 nm) is applied thereto from the volume hologram forming material layer side, whereby interference fringes produced by interference between reflected light from the original plate and the incident light are recorded on the material layer to give volume hologram information thereto. A full-color hologram can be obtained by recording hologram information by using laser beams having emission lines of wavelengths 476.5 nm, 532 nm and 647 nm, for example, as light sources.

When a photopolymerizable composition consisting essentially of a matrix polymer, a photopolymerizable compound, a photopolymerization initiator, and a sensitizing dye is used as a volume hologram recording material, a stable volume hologram is obtained by successively carrying out, after a recording process, a step of decomposing the photopolymerization initiator by irradiation with ultraviolet rays, and a step of diffusing the photopolymerizable compound by heat treatment. The volume hologram layer is colorless and transparent, aside from the color of the holographic image. Even if it is somewhat colored owing to various causes, the volume hologram layer is transparent and has sufficient visible light transmitting properties.

Figure 2A:
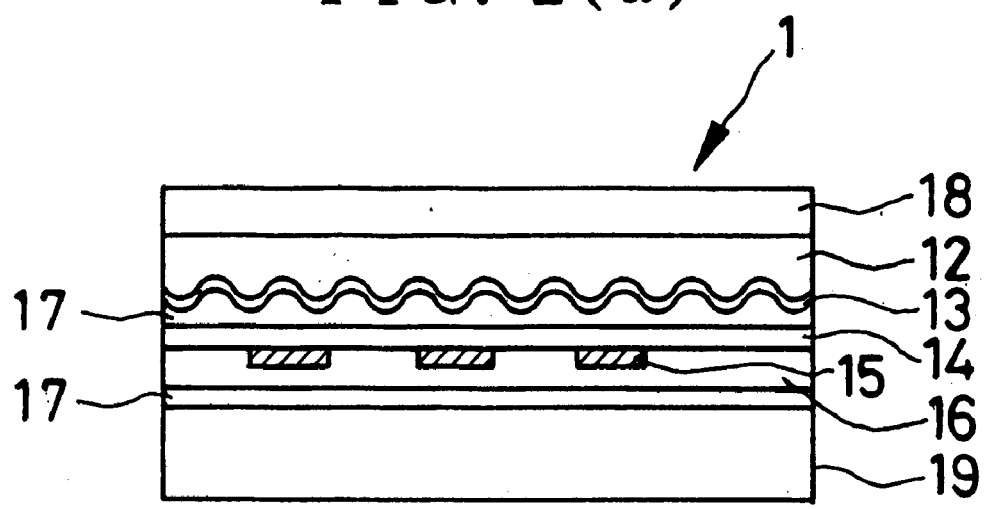
FIG. 2(a) is a sectional view of another hologram laminate according to the present invention.

FIG. 2(a) is a sectional view of another hologram laminate 1 according to the present invention. A metal thin-film layer 16, a release pattern 15, a transparent film 14, a relief hologram layer 12 and a surface protective layer 18 are laminated over a substrate 19 similar to that shown in FIG. 1(a) with a pressure-sensitive adhesive layer 17 interposed between each pair of adjacent lamination layers.

Figure 2B:
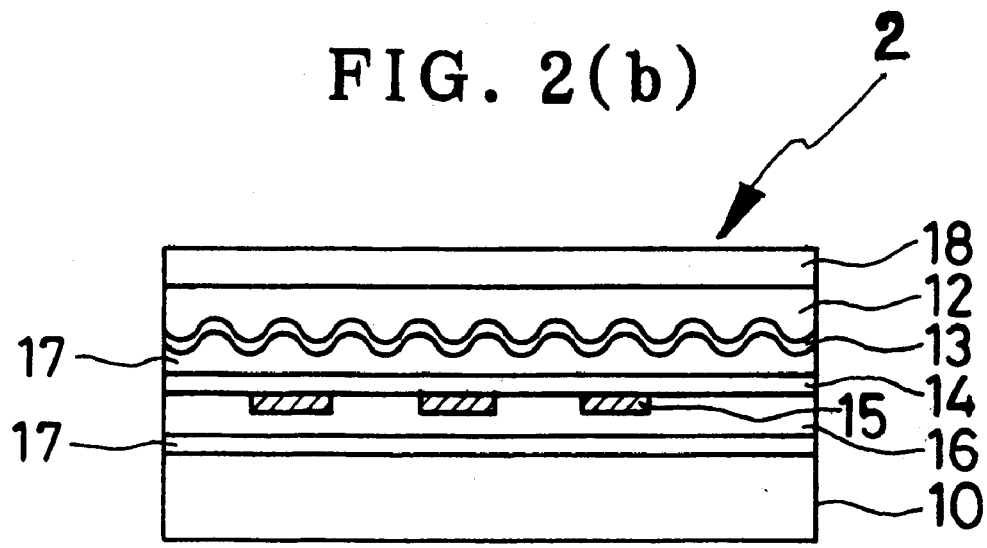
FIG. 2(b) is a sectional view of another hologram label according to the present invention.

FIG. 2(b) is a sectional view of a hologram label 2 used for the fabrication of the hologram laminate shown in FIG. 2(a). The hologram label has a release sheet 10 in place of the substrate 19. The rest of the hologram label has the same laminate structure as that shown in FIG. 2(a).

There is no particular restriction on materials used to form the relief hologram layer. It is possible to use various resin materials that have heretofore been used as relief hologram forming materials, e.g. thermosetting resins, thermoplastic resins, and ionizing radiation curing resins. The relief hologram layer may be formed as follows. The surface of a temporary substrate is coated with a surface relief hologram forming material to form a hologram forming layer. Thereafter, a press stamper produced from a master hologram is pressed against the surface of the hologram forming layer under heating to form a fine relief interference fringe pattern on the hologram forming layer surface. Then, a transparent thin-film layer 13 is formed over the surface of the relief interference fringe pattern. The thickness of the relief hologram layer is 0.1 μm to 50 μm, preferably 1 μm to 20 μm.

As the transparent thin-film layer 13, a light-reflecting metal thin film may be used to form a semitransmission type hologram. Alternatively, a transparent substance having a refractive index difference with respect to the hologram layer may be used to form a transmission type hologram.

Metal thin films usable to form a semitransmission type hologram are those made of metals such as Cr, Ti, Fe, Co, Ni, Cu, Ag, Au, Ge, Al, Mg, Sb, Pb, Pd, Cd, Bi, Sn, Se, In, Ga, Rb, etc., and oxides and nitrides of these metals. These materials may be used alone or in a combination of two or more. Among the above-mentioned metals, Al, Cr, Ni, Ag and Au are particularly preferable. The film thickness is preferably in the range of 50 Å to 2000 Å, more preferably 100 Å to 800 Å. A film thickness exceeding 2000 Å causes a reduction in transparency, which gives rise to a problem in terms of forgery prevention. The optical transmittance of a metal thin film for forming a semitransmission type hologram is preferably in the range of 0 to 10%.

A thin film for forming a transmission type hologram may be made by using any material as long as it has light transmitting properties with which the desired hologram effect can be manifested. For example, a transparent material different in refractive index from the resin of the hologram forming layer may be used. The refractive index of the transparent material may be either larger or smaller than the refractive index of the resin of the hologram forming layer. The refractive index difference is preferably at least 0.1, more preferably at least 0.5. An optimal refractive index difference is 1.0 or more. In general, however, the refractive index difference is not more than 2.0. Preferred examples of materials used to form a transmission type reflecting layer are titanium oxide ($TiO_2$), zinc sulfide (ZnS), and a Cu.Al composite metal oxide.

The transparent thin-film layer is preferably formed over the surface of the relief interference fringe pattern by a publicly known method, e.g. sublimation, vacuum evaporation, sputtering, reactive sputtering, ion plating, or electroplating.

In the hologram laminate shown in FIG. 1(a), the volume hologram layer 11 and the transparent film 14 are laminated with a transparent pressure-sensitive adhesive layer 17 interposed therebetween. However, no pressure-sensitive adhesive layer 17 is needed if the volume hologram layer 11 per se has pressure-sensitive adhesion properties and does not have releasability. In the hologram laminate shown in FIG. 2(a), the transparent thin-film layer 13 and the transparent film 14 are laminated with a transparent pressure-sensitive adhesive layer interposed therebetween.

Examples of usable pressure-sensitive adhesives are acrylic resin, acrylic ester resin, or their copolymers, styrene-butadiene copolymer, natural rubber, casein, gelatin, rosin ester, terpene resin, phenolic resin, styrene resin, coumarone-indene resin, polyvinyl ether, and silicone resin. It is also possible to use adhesives based on α-cyanoacrylate, silicone, maleimide, styrol, polyolefin, resorcinol, polyvinyl ether and silicone. Further, it is possible to use thermoplastic elastomers, e.g. SBS (styrene-butadiene-styrene block copolymer), SIS (styrene-isoprene-styrene block copolymer), and SEBS (styrene-ethylene-butylene-styrene block copolymer), and reactive hot-melt resins.

It should be noted that a heat-sealing compound is also usable as a pressure-sensitive adhesive. Examples of usable heat-sealing compounds are ethylene-vinyl acetate copolymer resin, polyamide resin, polyester resin, polyethylene resin, ethylene-isobutyl acrylate copolymer resin, butyral resin, polyvinyl acetate and its copolymer resin, cellulose derivatives, polymethyl methacrylate resin, polyvinyl ether resin, polyurethane resin, polycarbonate resin, polypropylene resin, epoxy resin, and phenolic resin. The heat-sealing temperature is preferably set in the range of 60 to 180° C.

The thickness of the pressure-sensitive adhesive layer is preferably set in the range of 4 μm to 20 μm. There are some methods for bonding using a pressure-sensitive adhesive. According to one bonding method, either or both of surfaces to be bonded together is coated with a pressure-sensitive adhesive in advance, and after the applied adhesive has been dried if necessary, the two surfaces are bonded together under pressure. During the process of bonding under pressure, heat may be applied, if necessary. According to another bonding method, a sheet with a releasable surface, which is known as "separator", is used. The releasable surface of the separator is coated with a pressure-sensitive adhesive, and the separator is bonded under pressure to either of surfaces to be bonded together. Thereafter, the separator is removed, and the other surface to be bonded is bonded under pressure to the pressure-sensitive adhesive surface exposed by removal of the separator. In a case where a separator is used immediately after it has been coated with a pressure-sensitive adhesive, a single separator will suffice. However, it is also possible to employ a method using a "double-sided tape", which is prepared by sandwiching a pressure-sensitive adhesive layer between two separators. First, one of the separators is removed, and the pressure-sensitive adhesive layer is bonded to one of two surfaces to be bonded together. Thereafter, the other separator is removed, and the two surfaces are bonded together. Either of the two bonding methods should be selectively used according to circumstances.

Examples of films usable as the transparent film 14 are polyethylene film, polypropylene film, polyfluoroethylene film, polyvinylidene fluoride film, polyvinyl chloride film, polyvinylidene chloride film, ethylene-vinyl alcohol film, polyvinyl alcohol film, polymethyl methacrylate film, polyether sulfone film, polyether ether ketone film, polyamide film, tetrafluoroethylene-perfluoroalkylvinyl ether copolymer film, polyester film such as polyethylene terephthalate film, and polyimide film. The thickness of the transparent film is in the range of 2 μm to 100 μm, preferably 25 μm to 50 μm.

The release pattern 15 provided on the substrate side of the transparent film 14 is preferably formed by the following method. A paint capable of imparting releasability is prepared, for example, by adding a releasability imparting substance, e.g. wax or silicone, to a paint consisting essentially of a binder resin having adhesion to the transparent film. The surface of the transparent film 14 is coated or printed with the paint in a pattern to form a release pattern so that the substrate-side layer will not sufficiently bond to the transparent film at the release pattern.

Conversely, a release pattern may be formed by coating or printing using a paint containing a substance acting as a primer for enhancing the bond strength between the transparent film and the substrate-side layer. In this case, the coated area exhibits stronger adhesion between the transparent film and the substrate-side layer than the non-coated area, thus producing a difference in releasability. It is also possible to form a release pattern by a method wherein a transparent film surface is coated or printed in a pattern with a component for crosslinking the pressure-sensitive adhesive used.

In any case, the release pattern 15 can be provided in the form of a dot pattern, a striped pattern, a lattice pattern, a symbol-like pattern, or other pattern, or in the form of characters or letters. When the release pattern 15 is provided in the form of characters or letters, it is preferable to use a word or a phrase that clearly shows that the hologram has been removed, e.g. "USED", "VOID", or "UNSEALED".

The metal thin-film layer 16 is laminated over the transparent film 14, which is provided with the release pattern 15, as a light-reflecting layer by a publicly known method, e.g. sublimation, vacuum evaporation, sputtering, reactive sputtering, ion plating, or electroplating. Examples of usable metal thin films are those made of metals such as Cr, Ti, Fe, Co, Ni, Cu, Ag, Au, Ge, Al, Mg, Sb, Pb, Pd, Cd, Bi, Sn, Se, In, Ga, Rb, etc., and oxides and nitrides of these metals. These materials may be used alone or in a combination of two or more. Among the above-mentioned metals, Al, Cr, Ni, Ag and Au are particularly preferable for the hologram laminate according to the present invention. A silver deposited layer is particularly preferable. A metal thin film, particularly a silver deposited layer, acts as a mirror surface for regularly reflected light and hence gives a favorable contrast to the hologram to provide an improvement in visibility of the hologram. For light other than regularly reflected light, the silver deposited layer appears to have a color close to black. Therefore, when left on the adherend in a pattern corresponding to the release pattern, the silver deposited layer can be recognized easily. Thus, the hologram laminate is excellent in forgery preventing properties.

The thickness of the metal thin-film layer is in the range of 50 Å to 20000 Å, more preferably 8000 Å to 10000 Å.

The surface protective layer 18 shown in FIGS. 1(a) to 2(b) covers the uppermost layer of the hologram laminate or the hologram label. The surface protective layer 18 may be a plastic film as exemplified with regard to the transparent film 14. The plastic film may be laminated over the uppermost layer with a transparent pressure-sensitive adhesive layer (as stated above) interposed therebetween. Alternatively, the surface protective layer 18 may be a coating formed by applying a coating solution for forming a surface protective layer. In this case, a temporary substrate is preferably laminated on the coating to protect it until the hologram laminate is actually used.

In a case where a surface protective layer is provided in contact with a volume hologram layer, as shown in FIGS.

1(a) and 1(b), it is preferable to use a transparent film because the hologram record may shift owing to migration of the solvent in the surface protective layer forming coating solution. The thickness of the transparent film is preferably in the range of 5 µm to 50 µm.

In a case where a surface protective layer is provided in contact with a relief hologram layer, as shown in FIGS. 2(a) and 2(b), a transparent film may be used as a surface protective layer. It is also possible to form a surface protective layer by applying a surface protective layer forming coating solution.

In a case where a transparent pressure-sensitive adhesive layer or a coating for surface protection is formed over the volume hologram layer by using a solvent, if there is a possibility that the hologram recording wavelength may shift owing to the migration of the solvent, it is preferable that the amount of shift of the hologram recording wavelength should be experimentally obtained in advance, and the hologram recording wavelength should be set in anticipation of the shift at the time of hologram recording. By doing so, the pressure-sensitive adhesive layer or the coating for surface protection can be formed directly on the volume hologram layer.

The surface protective layer forming coating solution is preferably prepared by using one selected from among methacrylate resins such as polymethyl methacrylate, and ionizing radiation curing epoxy-modified acrylic resin, urethane-modified acrylic resin and acryl-modified polyester resin having at least three functional groups, preferably at least six functional groups, in one molecule, and reactive to ionizing radiations such as ultraviolet radiations and electron radiations. To improve various functional characteristics, it is preferable to add to the coating solution at least one selected from among a polyacrylate resin, a polyvinyl chloride resin, a cellulosic resin, a silicone resin, chlorinated rubber, casein, various surface-active agents, wax, and metallic compounds and to form a surface protective layer with a dry thickness of 0.1 µm to 3 µm by using the coating solution prepared as stated above.

It is preferable that a temporary substrate with a release-treated surface for lamination should be laminated on the surface protective layer until the hologram laminate is actually used. The temporary substrate gives protective functions, e.g. resistance to light and resistance to scratching, to the hologram laminate. Examples of films usable as the temporary substrate are polyethylene film, polypropylene film, polyfluoroethylene film, polyvinylidene fluoride film, polyvinyl chloride film, polyvinylidene chloride film, ethylene-vinyl alcohol film, polyvinyl alcohol film, polymethyl methacrylate film, polyether sulfone film, polyether ether ketone film, polyamide film, tetrafluoroethylene-perfluoroalkylvinyl ether copolymer film, polyethylene terephthalate film, and polyimide film. The thickness of the temporary substrate is in the range of 2 µm to 200 µm, preferably 10 µm to 50 µm. The temporary substrate may be transparent. However, from the viewpoint of protecting the hologram layer until the hologram laminate is actually used, the temporary substrate is preferably an opaque film kneaded with an opacifying pigment, e.g. carbon black. By using such an opaque film, the hologram layer can be concealed until the hologram laminate is actually used. It is also possible to prevent the user from forgetting to remove the temporary substrate.

The surface of the surface protective layer 18 may be subjected to a hardcoat treatment, if necessary, for the purpose of improving the surface protective function. The hardcoat treatment is preferably carried out by coating the surface of the surface protective layer 18 with a coating material, for example, a material based on silicone, fluorine-containing silicone, melamine alkyd, or urethane acrylate (ultraviolet radiation curing type) to a thickness of 1 µm to 50 µm by a suitable coating method such as dipping coating, spray coating, or roll coating. The surface of the surface protective layer 18 or the hardcoat-treated surface thereof may be subjected to a release treatment. The release treatment is preferably performed by coating the surface of the surface protective layer 18 with a fluorine release agent, a silicone release agent, a stearate release agent, a wax release agent, or the like by a suitable coating method such as dipping coating, spray coating, or roll coating.

The foregoing is a description of the hologram laminate according to the present invention. It should be noted that the hologram laminate according to the present invention is separable between the transparent film 14 and the substrate 19. If the hologram laminate is separated to remove the hologram layer, the metal thin-film layer is cut off in such a manner that the metal thin-film layer that is in contact with the release pattern 15 is left on the substrate 19, whereas the metal thin-film layer in the area other than the release pattern 15 is left on the transparent film 14. Accordingly, when the hologram is separated, a metal thin-film layer pattern corresponding to the release pattern can be left on the substrate.

The hologram laminates according to the present invention that are shown in FIGS. 1(a) and 2(a) are made by using the hologram labels shown in FIGS. 1(b) and 2(b), respectively. Each hologram label has a release sheet 10 in place of the substrate 19 used in the corresponding hologram laminate.

The release sheet may be release paper that is conventionally used. It is also possible to use a releasable film obtained by release-treating a polyethylene terephthalate resin film or a polypropylene resin film, for example, with a fluorine release agent, a silicone release agent, or the like. After the release sheet 10 has been removed, the hologram label is stuck on an adherend requiring certification at the transparent pressure-sensitive adhesive layer side thereof to form a hologram laminate.

The hologram label is preferably cut in advance according to each particular use application and in conformity to an object on which it is to be stuck and the configuration of the adherend. Alternatively, cuts may previously be made in the laminated part, exclusive of the release sheet 10, so that each individual label with a predetermined shape can be cut off from a large-sized hologram label sheet or a hologram label sheet wound in a roll and applied to each particular object. Such processing can be effected by a cut-making process. To make cuts in the laminated part, exclusive of the release sheet, a cutting edge should be repeatedly moved down from the upper side of the hologram label through a stroke short of a distance corresponding to the thickness of the release sheet.

It is also possible to previously remove the laminated part, exclusive of the release sheet, from the area between each pair of adjacent hologram labels so that each individual hologram label of predetermined shape is left. In this case, the boundary portions of the release sheet may be perforated to make individual hologram labels separable from each other.

A method of making a hologram label according to the present invention will be described below by way of an example in which the hologram label shown in FIG. 1(b) is prepared. It should be noted that the hologram label shown in FIG. 2(b) may also be made by a similar transfer method except for the formation of the surface protective layer.

(1) A first laminated film is prepared, comprising a film with a release-treated surface (hereinafter referred to as a "release-treated film"), a hologram-recorded volume hologram 11, and a release-treated film.
(2) A second laminated film is prepared, comprising a surface protective layer 18, a transparent pressure-sensitive adhesive layer, and a release-treated film.
(3) A third laminated film is prepared, comprising a transparent film 14, a release pattern 15, a metal thin-film layer 16, and a release-treated film.
(4) A fourth laminated film is prepared, comprising a release-treated film, a transparent pressure-sensitive adhesive layer 17, and a release sheet 10.
(5) A fifth laminated film is prepared, comprising a release-treated film, a transparent pressure-sensitive adhesive layer 17, and a release-treated film. It should be noted that if a release-treated film is usable as a release sheet, the fifth laminated film may be used in place of the fourth laminated film.

One release-treated film is removed from the first laminated film prepared as stated above, and the release-treated film is removed from the second laminated film. Then, the first and second laminated films are laminated to each other to prepare a sixth laminated film comprising the surface protective layer 18, the transparent pressure-sensitive adhesive layer, the volume hologram layer 11, and the release-treated film.

Next, the release-treated film is removed from the third laminated film, and the release-treated film is removed from the fourth laminated film. Then, the third and fourth laminated films are laminated to each other to prepare a seventh laminated film comprising the transparent film 14, the release pattern 15, the metal thin-film layer 16, the transparent pressure-sensitive adhesive layer 17, and the release sheet 10.

Further, after the release-treated film has been removed from one side thereof, the fifth laminated film is laminated on the transparent film side of the seventh laminated film to prepare an eighth laminated film comprising the release-treated film, the transparent pressure-sensitive adhesive layer 17, the transparent film 14, the release pattern 15, the metal thin-film layer 16, the transparent pressure-sensitive adhesive layer 17, and the release sheet 10.

Finally, the release-treated films are removed from the sixth and eighth laminated films, and these films are laminated to each other to prepare a hologram label as shown in FIG. 1(b).

Articles usable as substrates in the hologram laminate and the hologram label according to the present invention include portable and expensive commodities that are likely to be forged, e.g. high-quality watches and cigarette lighters. These commodities are usable as substrates of hologram laminates according to the present invention. For example, the dial plate or back of a watch or a decorative casing used at the time of sales of a watch can serve as a substrate. The hologram laminate is also applicable to documents, certificates and so forth for appraising, for example, precious metals, art objects such as pictures, and antiques, to attest the value of the articles.

Further, articles to which the hologram laminate according to the present invention is applicable include commodity products that are likely to damage copyrighters or selling agencies if illegal copies of the products appear on the market, such as recorded video tapes, music or video compact discs, CD-ROMs containing computer software, and popular video game software. In addition, name-brand clothing products mainly for outdoor use, such as coats and rainwear excellent in permeability to air and water vapor, are expensive, and so are name-brand leather goods and bags, e.g. handbags. Therefore, low-priced copies of such name-brand products are likely to appear on the market. These commodities or packages containing them are all usable as substrates of hologram laminates according to the present invention.

The present invention may also be used for certification purposes, for example, for ID cards, passports, or credit cards. That is, the hologram laminate is stuck to an area of such a card where a letter or character, a picture or the like is not present to certify that the card is authentic. In addition, the present invention is applicable to checks, promissory notes, etc. which are made monetarily valuable by entry of required information, and also applicable to passbooks used at financial institutions, e.g. banks, although they are different in nature from the former. Securities such as stock certificates, bonds, and insurance policies cannot immediately be exchanged for money. However, the present invention may be applied to securities that are monetarily valuable.

The present invention will be described below by way of examples.

EXAMPLE 1

(1) Preparation of a First Laminated Film Comprising a Release-treated Film, a Hologram-recorded Volume Hologram 11, and a Release-treated Film A volume hologram was recorded on HRF-800X001 (available from Du Pont) comprising a release-treated PET film, a hologram recording material and a release-treated PET film by using a laser beam having a wavelength of 514 nm. Thereafter, UV irradiation was performed with a high-pressure mercury lamp (200 mJ/cm$^2$) to prepare a first laminated film.

(2) Preparation of a Second Laminated Film Comprising a Surface Protective Layer 18, a Transparent Pressure-sensitive Adhesive Layer, and a Release-treated Film A PET film {Lumirror T60 (50 μm in thickness), available from Toray Industries, Inc.} was coated with a pressure-sensitive adhesive to a dry thickness of 10 μm by using a comma coater. The pressure-sensitive adhesive had the following composition:

| | |
|---|---|
| Acrylic pressure-sensitive adhesive (Nissetsu PE-118, available from Nippon Carbide Co., Ltd.) | 100 parts by weight |
| Methyl ethyl ketone | 30 parts by weight |
| Toluene | 15 parts by weight |
| Ethyl acetate | 15 parts by weight |
| Isocyanate crosslinking agent (Nissetsu CK-101, available from Nippon Carbide Co., Ltd.) | 16 parts by weight |

Then, a release-treated PET film {"SP-PET" (50 μm in thickness) available from Tokyo Cellophane Paper Co., Ltd.} was laminated on the coated surface of the PET film to obtain a second laminated film.

(3) Preparation of a Third Laminated Film Comprising a Transparent Film 14, a Release Pattern 15, a Metal Thin-film Layer 16, and a Release-treated Film A PET film {Lumirror T60 (50 μm in thickness), available from Toray Industries, Inc.} was used as a transparent film 14. Predetermined letter printing was gravure-printed on the PET film with a dry thickness of 0.5 μm by using a coating solution to form a release pattern 15. The coating solution had the following composition:

| | |
|---|---|
| Acrylic pressure-sensitive adhesive (Nissetsu PE-118, available from Nippon Carbide Co., Ltd.) | 100 parts by weight |
| Methyl ethyl ketone | 30 parts by weight |
| Toluene | 15 parts by weight |
| Ethyl acetate | 15 parts by weight |
| Isocyanate crosslinking agent (Nissetsu CK-101, available from Nippon Carbide Co., Ltd.) | 2 parts by weight |
| Silicone ("ST94PA", available from Toray Industries, Inc.) | 8 parts by weight |

Next, a silver deposited layer with a thickness of 1 $\mu$m was formed on the release pattern-side surface of the transparent film 14. Thereafter, a release-treated PET film {"SP-PET" (50 $\mu$m in thickness) available from Tokyo Cellophane Paper Co., Ltd.} was laminated on the silver deposited layer to prepare a third laminated film.

(4) Preparation of a Fifth Laminated Film Comprising a Release-treated Film, a Transparent Pressure-sensitive Adhesive Layer 17, and a Release-treated Film A release-treated PET film {"SP-PET" (50 $\mu$m in thickness) available from Tokyo Cellophane Paper Co., Ltd.} was coated with a pressure-sensitive adhesive to a dry thickness of 10 $\mu$m by using a comma coater. The pressure-sensitive adhesive had the following composition:

| | |
|---|---|
| Acrylic pressure-sensitive adhesive (Nissetsu PE-118, available from Nippon Carbide Co., Ltd.) | 100 parts by weight |
| Methyl ethyl ketone | 30 parts by weight |
| Toluene | 15 parts by weight |
| Ethyl acetate | 15 parts by weight |
| Isocyanate crosslinking agent (Nissetsu CK-101, available from Nippon Carbide Co., Ltd.) | 16 parts by weight |

Then, a release-treated PET film {"SP-PET" (50 $\mu$m in thickness) available from Tokyo Cellophane Paper Co., Ltd.} was laminated on the coated surface of the PET film to obtain a fifth laminated film.

(5) Preparation of a Hologram Label

The volume hologram layer-side release-treated film was removed from the first laminated film, and the release-treated film was removed from the second laminated film. Then, the first and second laminated films were laminated to each other to prepare a laminated structure A comprising the surface protective layer 18, the transparent pressure-sensitive adhesive layer, the hologram-recorded volume hologram 11, and the release-treated film.

Then, the release-treated film was removed from the third laminated film, and the release-treated PET film was removed from the fifth laminated film. Thereafter, the fifth laminated film was laminated at the adhesive layer side thereof to the third laminated film to prepare a laminated structure B comprising the transparent film 14, the release pattern 15, the metal thin-film layer 16, the transparent pressure-sensitive adhesive layer 17, and the release sheet 10 (release-treated PET film).

After the release-treated film had been removed from one side thereof, the fifth laminated film was laminated at the adhesive layer side thereof on the transparent film side of the laminated structure B to prepare a laminated structure C comprising the release-treated film, the transparent pressure-sensitive adhesive layer 17, the transparent film 14, the release pattern 15, the metal thin-film layer 16, the transparent pressure-sensitive adhesive layer 17, and the release sheet 10.

Finally, after the release-treated film had been removed from each of them, the laminated structures A and C were laminated to each other. Thereafter, the resulting laminated structure was heated at 140° C. for 15 minutes to prepare a hologram label as shown in FIG. 1(b).

(6) Preparation of a Hologram Laminate

After the release sheet had been removed therefrom, the hologram label obtained as stated above was laminated at the adhesive layer side thereof on the margin of a compact disk (CD), thereby obtaining a hologram laminate as shown in FIG. 1(a).

The hologram laminate thus obtained provided a hologram with a background color given by a mirror surface. When the hologram, inclusive of the transparent film, was removed from the compact disk, the silver deposited layer was clearly left on the CD surface in a pattern corresponding to the release pattern. Thus, it was possible to clearly recognize that the hologram had been removed. The removed hologram also had a clear hollow pattern left of the silver deposited layer in correspondence to the release pattern.

For comparative purposes, a laminated film for comparison was prepared in the preparation of the above-described third laminated film. In the comparative example, the laminated film was prepared in the same way as the above except that the silver deposited layer was replaced by a colored layer formed by applying a coating solution having the following composition to a dry thickness of 20 $\mu$m by using a comma coater:

| | |
|---|---|
| Acrylic pressure-sensitive adhesive (Nissetsu PE-118, available from Nippon Carbide Co., Ltd.) | 100 parts by weight |
| Methyl ethyl ketone | 30 parts by weight |
| Toluene | 15 parts by weight |
| Ethyl acetate | 15 parts by weight |
| Isocyanate crosslinking agent (Nissetsu CK-101, available from Nippon Carbide Co., Ltd.) | 2 parts by weight |
| Silver pigment | 30 parts by weight |

A hologram label and a hologram laminate were fabricated in the same way as the above by using the laminated film for comparison.

The hologram laminate thus obtained scattered incident light so that the hologram was inferior in visibility. When the hologram, inclusive of the transparent film, was removed, the pattern left on the substrate was not sharply outlined because the pressure-sensitive adhesion of the colored layer to the release pattern was excessively high. Thus, a colored pattern corresponding to the release pattern could not satisfactorily be obtained. Accordingly, the hologram laminate was inadequate for use as a certification seal.

EXAMPLE 2

(Preparation of a Second Laminated Film Comprising a Temporary Substrate, a Coating for Surface Protection, and a Release-treated Film An opacified polyethylene terephthalate film {Lumirror T60 (50 $\mu$m in thickness), available from Toray Industries, Inc.} was used as a temporary substrate and coated with Hakurinisu UVC-5W (available from Showa Ink Kogyo K.K.) to a dry thickness of 1 $\mu$m by using a gravure coater to form a coating for surface protection. Thereafter, a release-treated PET film {"SP-PET" (50 $\mu$m in thickness) available from Tokyo Cellophane Paper Co., Ltd.} was laminated on the surface of the coating to prepare a second laminated film.

A volume hologram laminate label and a volume hologram laminate were fabricated in the same way as in Example 1 except that the second laminated film prepared as stated above was used in place of the second laminated film used in Example 1.

The hologram laminate thus obtained provided a hologram with a background color given by a mirror surface. When the hologram, inclusive of the transparent film, was removed from the compact disk, the silver deposited layer was clearly left on the CD surface in a pattern corresponding to the release pattern. Thus, it was possible to clearly recognize that the hologram had been removed. The removed hologram also had a clear hollow pattern left of the silver deposited layer in correspondence to the release pattern.

EXAMPLE 3

(1) Preparation of a First Laminated Film Comprising a Release-treated PET Film, a Relief Hologram Having a Transparent Thin-film Layer over the Surface of a Relief Interference Fringe Pattern, and a Release-treated PET Film Let us show an example of the production of an ionizing radiation curing urethane-modified acrylic resin, which is a relief hologram forming material.

40 g of toluene and 40 g of methyl ethyl ketone (MEK), together with an azo initiator, were charged into a 2-liter, four-port flask equipped with a cooler, a dropping funnel and a thermometer, and allowed to react for 8 hours at a temperature of 100 to 110° C. while a mixture of 22.4 g of 2-hydroxyethyl methacrylate (HEMA), 70.0 g of methyl methacrylate (MMA), 20 g of toluene, and 20 g of MEK was being dropped through the dropping funnel over a period of about 2 hours. Thereafter, the reaction product was cooled down to room temperature.

A mixture of 27.8 g of 2-isocyanate ethyl methacrylate (Karenz MOI, available from Showa Denko), 20 g of toluene, and 20 g of methyl ethyl ketone was added to the reaction product to carry out an addition reaction in the presence of dibutyltin laurate as catalyst. The reaction was terminated upon confirming the disappearance of an absorption peak of 2200 $cm^{-1}$ of the isocyanate group by IR analysis of the reaction product.

The solid content of the resin solution obtained was 41.0%, and the viscosity thereof was 130 mPa·sec. (30° C.). The molecular weight expressed in terms of that of standard polystyrene measured by GPC was 35000, and the average amount of carbon-carbon linkage introduced per molecule was 13.8 mol %.

A photo-curing resin composition was prepared as follows:

| | |
|---|---|
| The resin solution produced as stated above (solid content base) | 100 parts by weight |
| Release agent (trimethyl siloxy silicate-containing methyl polysiloxane: KF-7312, available from Shin-Etsu Chemicals Co. Ltd.) | 1 part by weight |
| Multifunctional monomer (SR-399, available from Sartomer Company) | 10 parts by weight |
| Polyester acrylate (M-6100, available from Toa Gosei Chemical Industry Co., Ltd.) | 10 parts by weight |
| Photosensitizer ("Irgacure 907"), available from Ciba Specialty Chemicals) | 5 parts by weight |

The above-described components were diluted with methyl ethyl ketone so that the solid content of the composition was adjusted to 50%.

Next, a first laminated film was prepared as follows. A polyethylene terephthalate film {PET: Lumirror T60 (25 μm in thickness) available from Toray Industries, Inc.} was coated with a release layer (Hakurinisu 45-3, available from Showa Ink Kogyo K.K.) by gravure coating at a speed of 20 m/min. Then, the applied coating solution was dried at 100° C. to vaporize the solvent, thereby obtaining a release-treated PET film having a layer structure comprising a release layer with a dry thickness of 1 $g/m^2$ and PET.

The photo-curing resin composition obtained as stated above was applied to the release layer on the release-treated PET film by a roll coater. Then, the applied resin composition was dried at 100° C. to vaporize the solvent, thereby obtaining a photosensitive film for duplication having a dry thickness of 2 $g/m^2$. All films obtained in this way were not sticky at room temperatures and hence capable of being stored in a roll state.

A press stamper produced from a master hologram made by using a laser beam was installed on an emboss roller of a duplicating system, and the photosensitive film for duplication prepared as stated above was set on the feed side. The stamper was hot-pressed on the photosensitive film at 150° C. to form a fine relief interference fringe pattern. It should be noted that a duplicate hologram formed on a resin plate from a master hologram may be used in place of the above-described master hologram. In this case, the resin plate formed with the duplicate hologram is stuck on the periphery of a cylinder.

Then, the photosensitive film was irradiated with ultraviolet rays from a mercury lamp to photo-cure the resin composition. Subsequently, a silver layer was deposited over the fine relief interference fringe pattern to a thickness of 500 Å by vacuum evaporation to form a semitransparent thin-film layer, thereby forming a transparent reflection type relief hologram. Thereafter, a release-treated PET film was laminated on the surface of the relief hologram to prepare a first laminated film.

(2) Preparation of a Second Laminated Film Comprising a Release-treated PET Film, a Surface Protective Layer, a Pressure-sensitive Adhesive Layer, and a Release-treated PET Film A release-treated PET film was coated with Hakurinisu K53A (available from Showa Ink Kogyo K.K.) to a dry thickness of 1 μm as a surface protective layer by using a gravure coater. Then, the release-treated PET film was coated with a pressure-sensitive adhesive to a dry thickness of 10 μm by using a comma coater to prepare a second laminated film. The pressure-sensitive adhesive had the following composition:

| | |
|---|---|
| Acrylic pressure-sensitive adhesive (Nissetsu PE-118, available from Nippon Carbide Co., Ltd.) | 100 parts by weight |
| Methyl ethyl ketone | 30 parts by weight |
| Toluene | 15 parts by weight |
| Ethyl acetate | 15 parts by weight |
| Isocyanate crosslinking agent (Nissetsu CK-101, available from Nippon Carbide Co., Ltd.) | 16 parts by weight |

(3) Preparation of a Hologram Label

The release-treated film was removed from the side of the first laminated film remote from the semitransparent thin-film layer, and the release-treated film was removed from the pressure-sensitive adhesive layer side of the second laminated film. Then, the first and second laminated films were laminated to each other to prepare a laminated structure D comprising the release-treated PET film, the surface protective layer, the pressure-sensitive adhesive layer, the relief hologram, and the release-treated PET film.

The release-treated PET film was removed from the laminated structure D, and the release-treated film was removed from the laminated structure C in Example 1. Then, the laminated structures C and D were laminated to each other to prepare a hologram label as shown in FIG. 2(b).

(Preparation of a Hologram Laminate)

After the release sheet had been removed therefrom, the hologram label obtained as stated above was laminated at the adhesive layer side thereof on the margin of a compact disk (CD), thereby obtaining a hologram laminate as shown in FIG. 2(a).

The hologram laminate thus obtained provided a hologram with a background color given by a mirror surface. When the hologram, inclusive of the transparent film, was removed from the compact disk, the silver deposited layer was left on the CD surface in a pattern corresponding to the release pattern. Thus, it was possible to clearly recognize that the hologram had been removed. The removed hologram also had a clear hollow pattern left of the silver deposited layer in correspondence to the release pattern.

What we claim:

1. A hologram laminate comprising a metal thin-film layer, a release pattern, a transparent film, a hologram layer and a surface protective layer laminated on an adherend in order mentioned, said hologram laminate being separable between said adherend and said transparent film, wherein when said hologram laminate is separated, said metal thin-film layer is left on said adherend in a pattern corresponding to said release pattern.

2. A hologram laminate according to claim 1, wherein said metal thin-film layer is a silver deposited layer.

3. A hologram laminate according to claim 1, wherein said surface protective layer is a coating for surface protection.

4. A hologram laminate according to claim 1, wherein said surface protective layer is a film.

5. A hologram label comprising a metal thin-film layer, a release pattern, a transparent film, a hologram layer and a surface protective layer laminated on a release sheet in order mentioned, said hologram label being separable between an adherend and said transparent film when said hologram label is stuck on the adherend at a surface thereof exposed by removal of said release sheet, wherein when said hologram label is separated, said metal thin-film layer is left on said adherend in a pattern corresponding to said release pattern.

* * * * *